(12) United States Patent
Barton et al.

(10) Patent No.: US 12,003,486 B2
(45) Date of Patent: Jun. 4, 2024

(54) CLOUD-DELIVERED FIREWALL RULES FOR CONTROLLING COMMANDS SENT TO DEVICES BASED ON OPERATIONAL TOLERANCE LIMITS

(71) Applicant: Cisco Technology, Inc., San Jose, CA (US)

(72) Inventors: Robert Edgar Barton, Richmond (CA); David Hanes, Lewisville, NC (US); Gonzalo Salgueiro, Raleigh, NC (US); Sebastian Jeuk, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 327 days.

(21) Appl. No.: 17/397,230

(22) Filed: Aug. 9, 2021

(65) Prior Publication Data

US 2023/0042610 A1 Feb. 9, 2023

(51) Int. Cl.
*H04L 9/40* (2022.01)
(52) U.S. Cl.
CPC ...... *H04L 63/0263* (2013.01); *H04L 63/0876* (2013.01); *H04L 63/102* (2013.01); *H04L 63/20* (2013.01)
(58) Field of Classification Search
None
See application file for complete search history.

(56) References Cited

U.S. PATENT DOCUMENTS

| 2008/0279133 | A1* | 11/2008 | Bienfait | H04L 67/51 370/315 |
|---|---|---|---|---|
| 2016/0094578 | A1 | 3/2016 | McQuillan et al. | |
| 2017/0033984 | A1 | 2/2017 | Lear et al. | |
| 2019/0028434 | A1 | 1/2019 | Cianfrocca | |
| 2020/0021560 | A1 | 1/2020 | Hefley et al. | |
| 2020/0120143 | A1 | 4/2020 | Nicoll et al. | |

* cited by examiner

*Primary Examiner* — Brandon Hoffman
(74) *Attorney, Agent, or Firm* — Lee & Hayes P.C.

(57) ABSTRACT

Techniques for a network controller associated with a firewall service to determine a network policy based on operational tolerances associated with a device, and cause the network policy to be provisioned at the firewall service where control commands, such as, for example, supervisory control and data acquisition (SCADA) commands, may be allowed or denied transmission to the device based on the operational tolerance(s) associated with the device. In some examples, the network controller may be configured as a manufacturer usage description (MUD) controller configured to transmit a MUD uniform resource identifier (URI), emitted by the device, to a MUD file server associated with the manufacturer of the device. The MUD file may be enhanced to include the operational tolerances associated with the device and transmitted back to the MUD controller where it may be parsed to determine a corresponding network policy.

20 Claims, 7 Drawing Sheets

CLOUD-DELIVERED FIREWALL RULES FOR CONTROLLING COMMANDS SENT TO DEVICES BASED ON OPERATIONAL TOLERANCE LIMITS

TECHNICAL FIELD

The present disclosure relates generally to accessing operational tolerances for Internet-of-Things (IoT) devices to generate network policies to be provisioned at a cloud-based firewall service.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, Internet-of-Things (IoT) devices are now becoming more managed by security profiles, indicating the network ports and/or standard communication patterns of the device, which may be provisioned at a cloud-based firewall service. While such security profiles allow networks to generate appropriate network policies to partially manage these IoT devices, such network policies may leave the IoT devices at risk for various types of malicious attacks to hardware components, software components, and the like.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
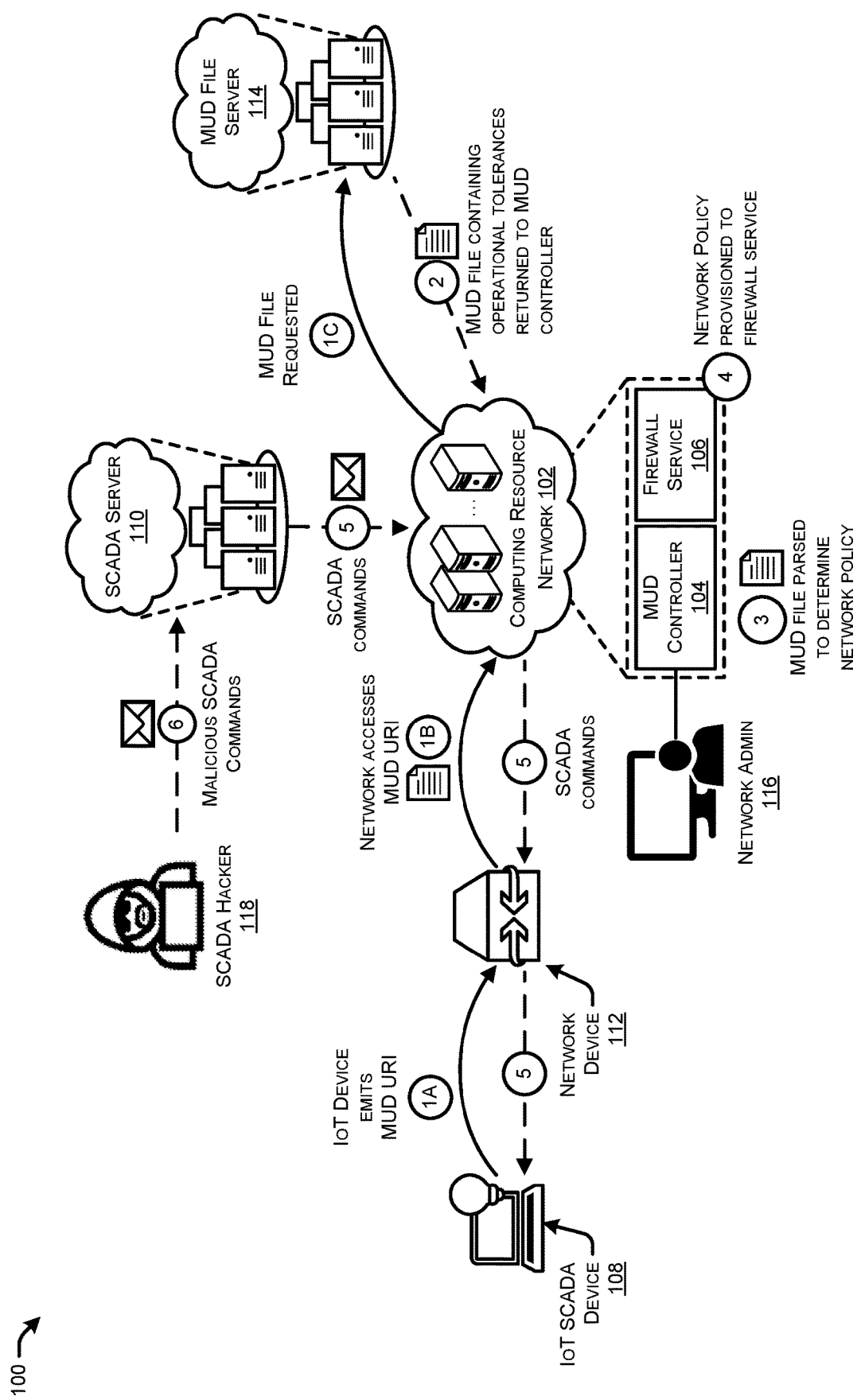
FIG. 1 illustrates a system-architecture diagram of an example flow for a manufacturer usage description (MUD) controller associated with a firewall service to receive a MUD file including one or more operational tolerance(s) associated with a device, parse the MUD file to translate the operational tolerances into a network policy, and cause the network policy to be provisioned at the firewall service where supervisory control and data acquisition (SCADA) commands within communication data may be analyzed by the firewall service and based on the network policy.

This disclosure describes a method for a network controller associated with a firewall service to determine a network policy based on operational tolerances associated with an IoT device, and cause the network policy to be provisioned at the firewall service where control commands may be allowed or denied transmission to the IoT device based on the operational tolerance(s) associated with the IoT device. The method includes receiving a manufacturer usage description (MUD) file including a firewall rule. In some examples, the firewall rule may allow or deny a transmission of a command to a device based at least in part on an operational tolerance associated with the device. Additionally, or alternatively, the method includes receiving communication data to be sent to the device. In some examples, the communication data may include the command. Additionally, or alternatively, the method includes receiving an indication of a current operational state of the device. Additionally, or alternatively, the method includes determining a predicted operational state of the device based at least in part on the command included in the communication data and the current operational state of the device. Additionally, or alternatively, the method includes determining that the predicted operational state of the device is permitted by the operational tolerance associated with the device. Additionally, or alternatively, the method includes sending the communication data to the device based at least in part on determining that the predicted operational state of the device is permitted by the operational tolerance associated with the device.

Additionally, or alternatively, the method includes receiving a firewall rule configured to allow or deny a command based at least in part on an operational tolerance associated with a device. Additionally, or alternatively, the method includes receiving communication data to be sent to the device, the communication data including the command. Additionally, or alternatively, the method includes determining a predicted operational state of the device based at least in part on the command included in the communication data and an indication of a current operational state of the device. Additionally, or alternatively, the method includes allowing the communication data to be sent to the device based at least in part on determining that the predicted operational state of the device is permitted by the operational tolerance associated with the device.

Additionally, or alternatively, the method includes receiving, at a manufacturer usage description (MUD) controller associated with a firewall service, a MUD uniform resource identifier (URI) indicating a type of an Internet-of-Things (IoT) device. Additionally, or alternatively, the method includes sending the MUD URI to a server associated with a manufacturer of the IoT device. Additionally, or alternatively, the method includes receiving a MUD file from the server. In some examples, the MUD file may include an operational tolerance associated with the IoT device. Additionally, or alternatively, the method includes determining, by the MUD controller, a network policy allowing or denying a transmission of a command to the IoT device based at least in part on the operational tolerance associated with the IoT device. Additionally, or alternatively, the method includes sending the network policy from the MUD controller to the firewall service.

Additionally, the techniques described herein may be performed by a system and/or device having non-transitory computer-readable media storing computer-executable instructions that, when executed by one or more processors, performs the method described above.

EXAMPLE EMBODIMENTS

The various applications where Internet-of-Things (IoT) devices may be leveraged continue to expand and thus ensuring that each IoT device is secure and/or operating according to a desired behavior for its intended use may become more challenging. Accordingly, IoT devices are now becoming more managed by security profiles, indicating network ports and/or standard communication patterns of the device, which may be provisioned at a cloud-based firewall service. While certain security profiles allow networks to generate appropriate network policies to partially manage these IoT devices, such network policies may still leave IoT devices at risk for various types of malicious attacks to hardware components, software components, and the like. For example, a malicious user may gain access to a command server, such as, for example a secure supervisory control and data acquisition (SCADA) server, configured to route communication data including control commands to IoT devices. In some examples, a malicious user may insert one or more malicious control commands into communication data to be routed to an IoT device, and may result in a breach of security associated with the IoT device, improper execution of software executing thereon, hardware components operating beyond operational tolerances of the IoT device, and the like.

This disclosure describes techniques to for a network controller associated with a firewall service to determine a network policy based on operational tolerances associated with the IoT device, and cause the network policy to be provisioned at the firewall service where control commands may be allowed or denied transmission to the IoT device based on the operational tolerance(s) associated with the IoT device. In some examples, the network controller may identify an operational tolerance associated with an IoT device and may use the operational tolerance to determine a firewall rule configured to allow or deny the transmission of communication data to an IoT device based on a current operational state of the IoT device, a command included in the communication data, and/or a predicted operational state determined based on the command and/or the current operational state. Additionally, or alternatively, the network controller may be configured as a manufacturer usage description (MUD) controller and may receive a MUD file associated with the IoT device. In some examples, the MUD file may include an extension configured to indicate one or more operational tolerances of the IoT device, where the operational tolerances may be leveraged to determine the network policy. Once determined, the network policy may be provisioned at a firewall service associated with the network controller, where communication data may be allowed or denied transmission to the IoT device. In some examples, the firewall service may be configured to identify one or more control commands included in the communication data. Additionally, or alternatively, the firewall service may be configured to determine a predicted operational state associated with the IoT device based on a current operational state of the IoT device and the one or more control commands. The firewall service may be configured to determine whether the predicted operational state of the IoT device is permitted by the operational tolerance associated with the IoT device as indicated by the network policy.

Take, for example, an IoT device connecting to the internet. The IoT device may emit a URI, which is received and utilized by a network device (e.g., a network switch, an internet gateway, etc.) to request and/or pull a MUD file from a MUD file server, associated with a manufacturer of the IoT device, on the internet. In some examples, a computing resource network may access the MUD URI via the network device. Additionally, or alternatively, the network device may transmit the MUD URI to one or more components of the computing resource network, such as, for example, a network controller (also referred to herein as a MUD controller). The MUD controller may be configured to facilitate the transmission of the URI from the IoT device and/or network device and to the MUD file server. The MUD file server may provide a MUD file associated with the IoT device to the MUD controller.

The MUD file server may comprise a machine building component configured to modify a traditional MUD file (indicating which protocols and/or ports should be allowed for a particular IoT device) associated with the IoT device to include one or more operational tolerances associated with the IoT device. In some examples, an operational tolerance may indicate a machine level tolerance associated with the IoT device (e.g., physical limitations of the hardware of the IoT device) and/or an application level tolerance associated with an application executing on the IoT device (e.g., software limitations of the application executing on the IoT device). In some examples, an operational tolerance may be based on a type of the IoT device, a location of the IoT device, an environment associated with the IoT device, an intended use associated with the IoT device, one or more additional devices associated with the IoT device (e.g., multiple IoT devices configured to operate together), and/or any combination thereof.

Additionally, or alternatively, the machine building component may be configured to further modify the traditional MUD file and/or the modified MUD file (e.g., the MUD file indicating operational tolerances) associated with the IoT device to include environmental information associated with the IoT device. In some examples, environmental information may indicate operating temperature thresholds associated with the IoT device, humidity and/or moisture level thresholds associated with the IoT device, required dust protection associated with the IoT device, and the like. Additionally, or alternatively, the machine building component may be configured to further modify the traditional MUD file and/or a modified MUD file associated with the IoT device to include compliance information associated with the IoT device. In some examples, compliance information may indicate various data and/or certifications associated with the IoT device, such as, for example, environmental data and/or certifications, immunity data and/or certifications, safety data and/or certifications, and/or emissions data and/or certifications.

In some examples, the network controller may then parse the MUD file to determine one or more network policies configured to allow or deny communication data to be transmitted to the IoT device. For example, the network controller may parse the MUD file to identify the one or more operational tolerances associated with the IoT device. The network controller may then translate any physical machine and/or application tolerance limits, indicated by the operational tolerances, to the protocol used to control the IoT device. That is, the network controller may translate the maximum tolerance specification in the appropriate protocol to a network policy that may be deployed on the firewall service associated with the computing resource network. In some examples, the operational tolerance may be configured other than maximum tolerances associated with the device, and configured to prevent other malicious operations from occurring, such as, for example, throttling of a motor (e.g., quick accelerations followed by quick decelerations), exceeding threshold minimum tolerances, control commands transmitted to and directly affecting a first device and indirectly affecting a second device beyond an operational tolerance, and the like. For example, if the specification indicates that the maximum motor speed of the IoT device (or a device associated with and configured to receive control commands via the IoT device) may not exceed 10,000 revolutions per-minute (RPM), this specification may be translated to a firewall rule that prevents any control commands sent from a SCADA server to the device that would cause the IoT device (or the associated device) to exceed this operational tolerance. Additionally, or alternatively, a network admin may utilize the operational tolerances as a baseline and configure a network policy with an operational tolerance fit to the use of the IoT device that is different from the operational tolerance specified by the MUD file. For example, the MUD file, associated with an IoT device controlling an autonomous vehicle, may include operational tolerances indicating that the vehicle should not exceed 100 mph, and an admin associated with the computing resource network may determine that use cases for the vehicle should not exceed 80 mph. As such, the admin may modify the network policy such that the operational tolerance associated with the IoT device indicates that the vehicle should not exceed 80 mph.

In some examples, the network policy may be configured as an application-layer machine rule to be enforced by the firewall service. In some examples, the protocol may comprise a variation of a SCADA protocol, such as, for example, Modbus, distributed network protocol 3 (DNP3), OPC unified architecture (OPC-UA), or any other control protocol.

Additionally, or alternatively, the network controller may parse the MUD file to identify recommended environmental information and/or compliance information associated with the IoT device. As previously described, the machine building component of the MUD file server may be configured to modify the MUD file to include environmental information and/or compliance information associated with the IoT device. In some examples, the network controller may be configured to translate the environmental information and/or compliance information into the appropriate protocol used by the IoT device to create a network policy that may be deployed on the firewall service associated with the computing resource network. Such environmental information may be critical to the placement of an IoT device in the proper location so that it may operate correctly and lower chances of failures of the IoT device. Traditionally, this is a manual task performed by a human that must ensure these specifications match up correctly. For example, an IoT device may be configured as an indoor sensor device, and thus may not have proper waterproofing and/or dust protection to be placed outdoors where it may be exposed to moisture, dust, heat, etc. In some examples, when dealing with a software-defined network or any other intent-based network, the analysis and/or understanding of environmental data and certifications for an IoT device may be handled by the computing resource network to ensure optimal network reliability and performance.

Once the network controller has parsed the MUD file for the operational tolerances (including environmental information and/or compliance information) and parsed the tolerances into a network policy, the network controller may be configured to provision the network policy to the firewall service. Based on the configuration of common security models used in operational tolerance (OT) networking environments, a SCADA server may be positioned at level 3 in the network, while controlled devices may be positioned at levels 1 and/or 2. As such, the firewall service may be configured such that it is positioned between levels 3 and 2, such that, any control commands received from the SCADA server are first analyzed by the firewall service according to the network policies provisioned thereon. For example, based on the techniques described herein, if a SCADA server is comprised by a malicious user and malicious SCADA control commands are sent to IoT devices with the intent to destroy the IoT devices, the application-level commands may be intercepted by the firewall service, the malicious commands may be identified in the communication data, and the IoT devices may be protected.

As previously described, with the network policies provisioned at the network firewall service, the firewall service may be configured to intercept application-layer commands and prevent the commands from reaching and/or affecting operation of the IoT devices. In some examples, the firewall service may deny transmission of malicious control commands following a malicious hacker gaining control of application systems configured to control IoT devices, such as, for example, SCADA. Additionally, or alternatively, the firewall service may deny transmission of traditional control commands that alone, or in combination with other control commands, violate the operational tolerance associated with the IoT device. In some examples, the firewall service may be further configured to determine a predicted operational state associated with the IoT device by leveraging telemetry data collected by a component of the computing resource network and indicating a current operational state of the IoT device. For example, the firewall service may determine the predicted operational state associated with the IoT device based on the current operational state of the IoT device (indicated by the telemetry data) and the operational effects associated with the control command on the current operational state. Take, for example, an operational tolerance of an IoT device (or an associated operational device) that indicates an operational threshold (e.g., an operational tolerance specifying that a maximum speed of an autonomous vehicle should not exceed 100 miles per hour) and telemetry data associated with the IoT device indicates that the current operational state of the IoT device is 90% to the operational tolerance (e.g., the autonomous vehicle is currently traveling at a speed of 90 miles per hour). When the firewall service identifies a control command in communication data, the firewall service may analyze the control command to determine the predicted operational state of the IoT device. If the firewall service determines that execution of the control command (e.g., a control command representing an instruction to increase the speed by 11 miles per hour) by the IoT device at the current operational state (e.g., 90 miles per hour) may result in the IoT device exceeding the operational tolerance (e.g., predicted state being 101 miles per hour and exceeding the 100 miles per hour operational tolerance), the firewall service may deny transmission of the communication data to the IoT device.

As previously described, a monitoring component of the computing resource network, such as, for example, the network controller and/or an application executing thereon, may be configured to collect telemetry data from various sensors in the industrial network. In some examples, the telemetry data may indicate a current operational state of the IoT device. That is, the telemetry data may indicate a current operational state of an application executing on the IoT device and/or a current operational state of physical hardware components of the IoT device. In some examples, the monitoring component may be configured to continually analyze the telemetry data. In some examples, the monitoring component may determine that a current operational state of an IoT device, as indicated by the telemetry data, is not permitted by an operational threshold associated with the IoT device as specified by the MUD file, for example. In such examples, an alarm may be generated by the monitoring component. Additionally, or alternatively, an application driving the IoT device (e.g., a SCADA server) can be issued the alarm and may be configured to issue control commands causing the IoT device to change behavior to bring the operational state back within tolerable limits.

As described herein, a computing-based and/or cloud-based solution and/or service can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to providing firewall rules specific to operational tolerances associated with IoT devices. For instance, the techniques described herein may parse an enhanced MUD file and/or utilize a local security profile to determine operational tolerances indicating physical machine-level tolerances and/or application-level tolerances associated with IoT devices and/or software executing thereon. By parsing the MUD file to translate an operational tolerance into a network policy, a firewall service may identify and deny the transmission of communication data, including malicious and/or inappropriate control commands, to IoT devices. Additionally, or alternatively, by utilizing extended MUD files and/or local security profiles, environmental information (e.g., operating temperature thresholds associated with the IoT device, humidity and/or moisture level thresholds associated with the IoT device, required dust protection associated with the IoT device, etc.) and/or compliance information (e.g., environmental data and/or certifications, immunity data and/or certifications, safety data and/or certifications, and/or emissions data and/or certifications) associated with the IoT device may be further leveraged by a network controller and translated into the network policy.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example system-architecture diagram 100 and an example flow for a computing resource network 102 including a manufacturer usage description (MUD) controller 104 associated with a firewall service 106 to receive a MUD file including one or more operational tolerance(s) associated with a device 108, parse the MUD file to translate the operational tolerances into a network policy, and cause the network policy to be provisioned at the firewall service 106 where supervisory control and data acquisition (SCADA) commands, issued by a SCADA server 110, within communication data may be analyzed by the firewall service 106 and based on the network policy.

The computing resource network 102 may comprise one or more data centers that include various networking components, such as, a Software-Defined-Networking (SDN) controller, spine network switches, and network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, network device 112.

Take, for example, an IoT device 108 connecting to a computing resource network 102. The IoT device 108 may emit a URI, which is received and utilized by a network device 112 (e.g., a network switch, an internet gateway, etc.) to request and/or pull a MUD file from a MUD file server 114, associated with a manufacturer of the IoT device 108, on the internet. In some examples, a controller 104 associated with the computing resource network 102 may identify an operational tolerance associated with the IoT device 108 and may use the operational tolerance to determine a firewall rule configured to allow or deny the transmission of communication data to the IoT device 108 based on a current operational state of the IoT device 108, a command included in the communication data, and/or a predicted operational state determined based on the command and/or the current operational state. In some examples, the operational tolerances associated with an IoT device 108 may be stored in a local database associated with the computing resource network 102. Additionally, or alternatively, the network controller 104 may be configured as a manufacturer usage description (MUD) controller 104 and may receive a MUD file associated with the IoT device 108. In some examples, the MUD file may include an extension configured to indicate one or more operational tolerances of the IoT device 108, where the operational tolerances may be leveraged to determine the network policy. Once determined, the network policy may be provisioned at a firewall service 106 associated with the controller 104, where communication data may be allowed or denied transmission to the IoT device 108. In some examples, the firewall service 106 may be configured to identify one or more control commands included in the communication data. Additionally, or alternatively, the firewall service 106 may be configured to determine a predicted operational state associated with the IoT device 108 based on a current operational state of the IoT device 108 and the one or more control commands. The firewall service 106 may be configured to determine whether the predicted operational state of the IoT device 108 is permitted by the operational tolerance associated with the IoT device 108 as indicated by the network policy.

At "1A," the IoT device 108 may emit a URI, which is received and utilized by a network device 112 (e.g., a network switch, an internet gateway, etc.) to request and/or pull a MUD file from a MUD file server 114, associated with a manufacturer of the IoT device 108, on the internet.

At "1B," a computing resource network 102 may access the MUD URI via the network device 112. Additionally, or alternatively, the network device 112 may transmit the MUD URI to one or more components of the computing resource network 102, such as, for example, a network controller 104 (also referred to herein as a MUD controller 104).

At "1C," the MUD controller 104 may be configured to facilitate the transmission of the URI from the IoT device 108 and/or network device 112 and to the MUD file server 114.

At "2," the MUD file server 114 may provide a MUD file associated with the IoT device 108 to the MUD controller 104. The MUD file server 114 may comprise a machine building component configured to modify a traditional MUD file (indicating which protocols and/or ports should be allowed for a particular IoT device 108) associated with the IoT device 108 to include one or more operational tolerances associated with the IoT device 108. In some examples, an operational tolerance may indicate a machine level tolerance associated with the IoT device 108 (e.g., physical limitations of the hardware of the IoT device 108) and/or an application level tolerance associated with an application executing on the IoT device 108 (e.g., software limitations of the application executing on the IoT device 108). In some examples, an operational tolerance may be based on a type of the IoT device 108, a location of the IoT device 108, an environment associated with the IoT device 108, an intended use associated with the IoT device 108, one or more additional devices associated with the IoT device 108 (e.g., multiple IoT devices configured to operate together), and/or any combination thereof.

At "3," the controller 104 may then parse the MUD file to determine one or more network policies configured to allow or deny communication data to be transmitted to the IoT device 108. For example, the controller 104 may parse the MUD file to identify the one or more operational tolerances associated with the IoT device 108. The controller 104 may then translate any physical machine and/or application tolerance limits, indicated by the operational tolerances, to the protocol used to control the IoT device 108. That is, the controller 104 may translate the maximum tolerance specification in the appropriate protocol to a network policy that may be deployed on the firewall service 106 associated with the computing resource network 102.

In some examples, the operational tolerance may be configured other than maximum tolerances associated with the device 108, and configured to prevent other malicious operations from occurring, such as, for example, throttling of a motor (e.g., quick accelerations followed by quick decelerations), exceeding threshold minimum tolerances, control commands transmitted to and directly affecting a first device and indirectly affecting a second device beyond an operational tolerance, and the like. For example, if the specification indicates that the maximum motor speed of the IoT device 108 (or a device associated with and configured to receive control commands via the IoT device 108) may not exceed 10,000 revolutions per-minute (RPM), this specification may be translated to a firewall rule that prevents any control commands sent from a SCADA server 110 to the device that would cause the IoT device 108 (or the associated device) to exceed this operational tolerance. In some examples, the network policy may be configured as an application-layer machine rule to be enforced by the firewall service 106. In some examples, the protocol may comprise a variation of a SCADA protocol, such as, for example, Modbus, distributed network protocol 3 (DNP3), OPC unified architecture (OPC-UA), or any other control protocol.

Additionally, or alternatively, a network admin 116 may utilize the operational tolerances as a baseline and configure a network policy with an operational tolerance fit to the use of the IoT device 108 that may be different from the operational tolerance specified by the MUD file. For example, the MUD file, associated with an IoT device 108 controlling an autonomous vehicle, may include operational tolerances indicating that the vehicle should not exceed 100 mph, and an admin 116 associated with the computing resource network 102 may determine that potential use cases for the vehicle should not exceed 80 mph. As such, the admin 116 may modify the network policy such that the operational tolerance associated with the IoT device 108 indicates that the vehicle should not exceed 80 mph.

In some examples, the network policy may be configured as an application-layer machine rule to be enforced by the firewall service. In some examples, the protocol may comprise a variation of a SCADA protocol, such as, for example, Modbus, distributed network protocol 3 (DNP3), OPC unified architecture (OPC-UA), or any other control protocol.

At "4," once the controller 104 has parsed the MUD file for the operational tolerances and parsed the tolerances into a network policy, the controller 104 may be configured to provision the network policy to the firewall service 106. Based on the configuration of common security models used in operational tolerance (OT) networking environments, a SCADA server 110 may be positioned at level 3 in the network, while controlled devices (e.g., the IoT device 108) may be positioned at levels 1 and/or 2. As such, the firewall service 106 may be configured such that it is positioned between levels 3 and 2, such that, any control commands received from the SCADA server 110 are first analyzed by the firewall service 106 according to the network policies provisioned thereon, before being allowed or denied further transmission to the IoT device 108. For example, based on the techniques described herein, if a SCADA server 110 is comprised by a malicious user, such as, for example, a SCADA hacker 118 and malicious SCADA control commands are sent to IoT devices 108 with the intent to destroy the IoT devices 108, the application-level commands may be intercepted by the firewall service 106, the malicious commands may be identified in the communication data, and the IoT devices 108 may be protected.

At "5," with the network policies provisioned at the network firewall service 106, the firewall service 106 may be configured to intercept application-layer commands, analyze the commands, and allow or prevent the commands from reaching and/or affecting operation of the IoT devices 108. In some examples, the firewall service 106 may deny transmission of traditional control commands that alone, or in combination with other control commands, violate the operational tolerance associated with the IoT device 108.

In some examples, the firewall service 106 and/or MUD controller 104 may be further configured to determine a predicted operational state associated with the IoT device 108 by leveraging telemetry data collected by a component of the computing resource network 102 and indicating a current operational state of the IoT device 108. For example, the firewall service 106 may determine the predicted operational state associated with the IoT device 108 based on the current operational state of the IoT device 108 (indicated by the telemetry data) and the operational effects associated with the control command on the current operational state.

Take, for example, an operational tolerance of an IoT device 108 (or an associated operational device) that indicates an operational threshold (e.g., an operational tolerance specifying that a maximum speed of an autonomous vehicle should not exceed 100 miles per hour) and telemetry data associated with the IoT device 108 indicates that the current operational state of the IoT device 108 is 90% to the operational tolerance (e.g., the autonomous vehicle is currently traveling at a speed of 90 miles per hour). When the firewall service 106 identifies a control command in communication data, the firewall service 106 may analyze the control command to determine the predicted operational state of the IoT device 108. If the firewall service 106 determines that execution of the control command (e.g., a control command representing an instruction to increase the speed by 11 miles per hour) by the IoT device 108 at the current operational state (e.g., 90 miles per hour) may result in the IoT device 108 exceeding the operational tolerance (e.g., predicted state being 101 miles per hour and exceeding the 100 miles per hour operational tolerance), the firewall service 106 may deny transmission of the communication data to the IoT device 108.

At "6," a SCADA hacker 118 may gain control of the SCADA server 110 configured to issue control commands to the IoT device 108. The SCADA hacker 118 may then issue malicious control commands on behalf of the SCADA server 110 (or other application control systems servers) to be transmitted to the IoT device 108. In some examples, the firewall service 108 may deny transmission of the malicious control commands following the malicious hacker 118 gaining control of application systems configured to control IoT devices 108, such as, for example, SCADA. Thus, the network policy determined by the controller 104 parsing a MUD file associated with an IoT device 108, and received from a MUD file server 114 associated with a manufacturer of the IoT device 108, may provide the IoT device 108 with an enhanced level of security from a hacker 118 gaining control of a control server (e.g., the SCADA server 110).

Figure 2:
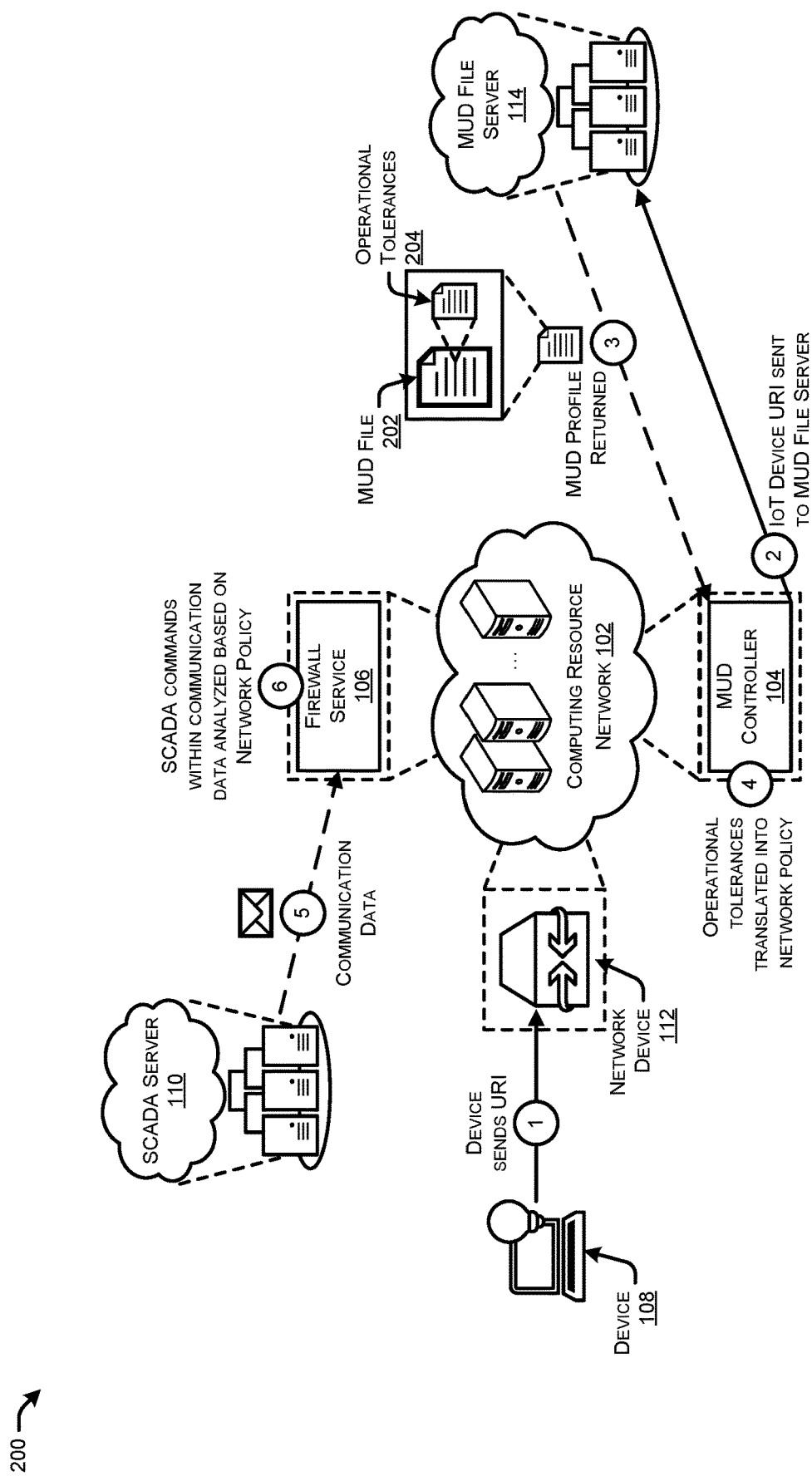
FIG. 2 illustrates system-architecture diagram of an example flow for a MUD controller associated with a firewall service to receive a MUD file including operational tolerances associated with an IoT device, translate the operational tolerances into a network policy, and cause the firewall service to analyze communication data and allow or deny SCADA commands therein based on the network policy.

FIG. 2 illustrates an example system-architecture diagram 200 and an example flow for computing resource network 102 including a MUD controller 104 associated with a firewall service 106 to receive a MUD file 202 including operational tolerances 204 associated with an IoT device 108, translate the operational tolerances into a network policy, and cause the firewall service 106 to analyze communication data and allow or deny control commands therein based on the network policy.

The computing resource network 102 may comprise one or more data centers that include various networking components, such as, a Software-Defined-Networking (SDN) controller, spine network switches, and network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, the network device 112

Take, for example, an IoT device 108 connecting to a computing resource network 102. The IoT device 108 may emit a URI, which is received and utilized by a network device 112 (e.g., a network switch, an internet gateway, etc.) to request and/or pull a MUD file 202 from a MUD file server 114, associated with a manufacturer of the IoT device 108, on the internet. In some examples, a controller 104 associated with the computing resource network 102 may identify an operational tolerance 204 associated with the IoT device 108 and may use the operational tolerance 204 to determine a firewall rule configured to allow or deny the transmission of communication data to the IoT device 108 based on a current operational state of the IoT device 108, a command included in the communication data, and/or a predicted operational state determined based on the command and/or the current operational state. In some examples, the operational tolerances 204 associated with an IoT device 108 may be stored in a local database associated with the computing resource network 102.

Additionally, or alternatively, the network controller 104 may be configured as a manufacturer usage description (MUD) controller 104 and may receive a MUD file 202 associated with the IoT device 108. In some examples, the MUD file 202 may include an extension configured to indicate one or more operational tolerances 204 of the IoT device 108, where the operational tolerances 204 may be leveraged to determine the network policy. Once determined, the network policy may be provisioned at a firewall service 106 associated with the controller 104, where communication data may be allowed or denied transmission to the IoT device 108. In some examples, the firewall service 106 may be configured to identify one or more control commands included in the communication data. Additionally, or alternatively, the firewall service 106 may be configured to determine a predicted operational state associated with the IoT device 108 based on a current operational state of the IoT device 108 and the one or more control commands. The firewall service 106 may be configured to determine whether the predicted operational state of the IoT device 108 is permitted by the operational tolerance 204 associated with the IoT device 108 as indicated by the network policy.

At "1," the IoT device 108 may emit a URI, which is received and utilized by a network device 112 (e.g., a network switch, an internet gateway, etc.) to request and/or pull a MUD file 202 from a MUD file server 114, associated with a manufacturer of the IoT device 108, on the internet. In some examples, a computing resource network 102 may access the MUD URI via the network device 112. Additionally, or alternatively, the network device 112 may transmit the MUD URI to one or more components of the computing resource network 102, such as, for example, a network controller 104 (also referred to herein as a MUD controller 104).

At "2," the MUD controller 104 may be configured to facilitate the transmission of the URI from the IoT device 108 and/or network device 112 and to the MUD file server 114.

At "3," the MUD file server 114 may provide a MUD file 202 associated with the IoT device 108 to the MUD controller 104. The MUD file server 114 may comprise a machine building component configured to modify a traditional MUD file 202 (indicating which protocols and/or ports should be allowed for a particular IoT device 108) associated with the IoT device 108 to include one or more operational tolerances 204 associated with the IoT device 108. In some examples, an operational tolerance 204 may indicate a machine level tolerance associated with the IoT device 108 (e.g., physical limitations of the hardware of the IoT device 108) and/or an application level tolerance associated with an application executing on the IoT device 108 (e.g., software limitations of the application executing on the IoT device 108). In some examples, an operational tolerance 204 may be based on a type of the IoT device 108, a location of the IoT device 108, an environment associated with the IoT device 108, an intended use associated with the IoT device 108, one or more additional devices associated with the IoT device 108 (e.g., multiple IoT devices configured to operate together), and/or any combination thereof.

Additionally, or alternatively, the machine building component may be configured to further modify the traditional MUD file and/or the modified MUD file 202 (e.g., the MUD file 202 indicating operational tolerances 204) associated with the IoT device 108 to include environmental information associated with the IoT device 108. In some examples, environmental information may indicate operating temperature thresholds associated with the IoT device 108, humidity and/or moisture level thresholds associated with the IoT device 108, required dust protection associated with the IoT device 108, and the like. Additionally, or alternatively, the machine building component may be configured to further modify the traditional MUD file and/or a modified MUD file 202 associated with the IoT device 108 to include compliance information associated with the IoT device 108. In some examples, compliance information may indicate various data and/or certifications associated with the IoT device 108, such as, for example, environmental data and/or certifications, immunity data and/or certifications, safety data and/or certifications, and/or emissions data and/or certifications.

At "4," the controller 104 may then parse the MUD file 202 to translate the operational tolerances 204 (including the environmental information and/or compliance information) into one or more network policies configured to allow or deny communication data to be transmitted to the IoT device 108. For example, the controller 104 may parse the MUD file 202 to identify the one or more operational tolerances 204 associated with the IoT device 108. The controller 104 may then translate any physical machine and/or application tolerance limits, indicated by the operational tolerances 204, to the protocol used to control the IoT device 108. That is, the controller 104 may translate the maximum tolerance specification in the appropriate protocol to a network policy that may be deployed on the firewall service 106 associated with the computing resource network 102.

In some examples, the operational tolerance 204 may be configured other than maximum tolerances associated with the device 108, and configured to prevent other malicious operations from occurring, such as, for example, throttling of a motor (e.g., quick accelerations followed by quick decelerations), exceeding threshold minimum tolerances, control commands transmitted to and directly affecting a first device and indirectly affecting a second device beyond an operational tolerance 204, and the like. For example, if the specification indicates that the maximum motor speed of the IoT device 108 (or a device associated with and configured to receive control commands via the IoT device 108) may not exceed 10,000 revolutions per-minute (RPM), this specification may be translated to a firewall rule that prevents any control commands sent from a SCADA server 110 to the device that would cause the IoT device 108 (or the associated device) to exceed this operational tolerance 204. In some examples, the network policy may be configured as an application-layer machine rule to be enforced by the firewall service 106. In some examples, the protocol may comprise a variation of a SCADA protocol, such as, for example, Modbus, distributed network protocol 3 (DNP3), OPC unified architecture (OPC-UA), or any other control protocol.

Additionally, or alternatively, the network controller 104 may parse the MUD file 202 to identify recommended environmental information and/or compliance information associated with the IoT device 108. As previously described, the machine building component of the MUD file server 114 may be configured to modify the MUD file 202 to include environmental information and/or compliance information associated with the IoT device 108. In some examples, the network controller 104 may be configured to translate the environmental information and/or compliance information into the appropriate protocol used by the IoT device 108 to create a network policy that may be deployed on the firewall service 106 associated with the computing resource network 102. Such environmental information may be critical to the placement of an IoT device 108 in the proper location so that it may operate correctly and lower chances of failures of the IoT device 108. Traditionally, this is a manual task performed by a human that must ensure these specifications match up correctly. For example, an IoT device 108 may be configured as an indoor sensor device, and thus may not have proper waterproofing and/or dust protection to be placed outdoors where it may be exposed to moisture, dust, heat, etc. In some examples, when dealing with a software-defined network or any other intent-based network, the analysis and/or understanding of environmental data and certifications for an IoT device 108 may be handled by the computing resource network 102 to ensure optimal network reliability and performance.

Additionally, or alternatively, a network admin may utilize the operational tolerances 204 as a baseline and configure a network policy with an operational tolerance fit to the use of the IoT device 108 that may be different from the operational tolerance specified by the MUD file. For example, the MUD file, associated with an IoT device 108 controlling an autonomous vehicle, may include operational tolerances indicating that the vehicle should not exceed 100 mph, and an admin associated with the computing resource network 102 may determine that potential use cases for the vehicle should not exceed 80 mph. As such, the admin may modify the network policy such that the operational tolerance associated with the IoT device 108 indicates that the vehicle should not exceed 80 mph.

In some examples, the network policy may be configured as an application-layer machine rule to be enforced by the firewall service. In some examples, the protocol may comprise a variation of a SCADA protocol, such as, for example, Modbus, distributed network protocol 3 (DNP3), OPC unified architecture (OPC-UA), or any other control protocol.

In some examples, once the controller 104 has parsed the MUD file 202 for the operational tolerances 204 (including the environmental information and/or compliance information) and parsed the tolerances into a network policy, the controller 104 may be configured to provision the network policy to the firewall service 106. Based on the configuration of common security models used in operational tolerance (OT) networking environments, a SCADA server 110 may be positioned at level 3 in the network, while controlled devices (e.g., the IoT device 108) may be positioned at levels 1 and/or 2. As such, the firewall service 106 may be configured such that it is positioned between levels 3 and 2, such that, any control commands received from the SCADA server 110 are first analyzed by the firewall service 106 according to the network policies provisioned thereon, before being allowed or denied further transmission to the IoT device 108. For example, based on the techniques described herein, if a SCADA server 110 is comprised by a malicious user, such as, for example, a SCADA hacker 118 and malicious SCADA control commands are sent to IoT devices 108 with the intent to destroy the IoT devices 108, the application-level commands may be intercepted by the firewall service 106, the malicious commands may be identified in the communication data, and the IoT devices 108 may be protected.

At "5," the firewall service 106 may receive communication data from a control server, such as, for example, the SCADA server 110. In some examples, the communication data may include one or more control commands for controlling execution of the IoT device 108. That is, the firewall service 106 may be configured to intercept application-layer commands, analyze the commands, and allow or prevent the commands from reaching and/or affecting operation of the IoT devices 108. In some examples, the firewall service 106 may deny transmission of traditional control commands that alone, or in combination with other control commands, violate the operational tolerance associated with the IoT device 108.

At "6," the firewall service 106 may be configured to analyze the control commands included in the communication data received from the SCADA server 110. In some examples, the control commands may be allowed and/or denied based on how the command will affect a current operational state of the IoT device. That is, the firewall service 106, or an application executing in association with the computing resource network 102 and/or the firewall service 106, may be configured to determine a predicted operational state associated with the IoT device.

In some examples, the firewall service 106 and/or an associated application or service may be further configured to determine a predicted operational state associated with the IoT device 108 by leveraging telemetry data collected by a component of the computing resource network 102 and indicating a current operational state of the IoT device 108. For example, the firewall service 106 may determine the predicted operational state associated with the IoT device 108 based on the current operational state of the IoT device 108 (indicated by the telemetry data) and the operational effects associated with the control command on the current operational state.

Take, for example, an operational tolerance of an IoT device 108 (or an associated operational device) that indicates an operational threshold (e.g., an operational tolerance specifying that a maximum speed of an autonomous vehicle should not exceed 100 miles per hour) and telemetry data associated with the IoT device 108 indicates that the current operational state of the IoT device 108 is 90% to the operational tolerance (e.g., the autonomous vehicle is currently traveling at a speed of 90 miles per hour). When the firewall service 106 identifies a control command in communication data, the firewall service 106 may analyze the control command to determine the predicted operational state of the IoT device 108. If the firewall service 106 determines that execution of the control command (e.g., a control command representing an instruction to increase the speed by 11 miles per hour) by the IoT device 108 at the current operational state (e.g., 90 miles per hour) may result in the IoT device 108 exceeding the operational tolerance (e.g., predicted state being 101 miles per hour and exceeding the 100 miles per hour operational tolerance), the firewall service 106 may deny transmission of the communication data to the IoT device 108.

Figure 3:
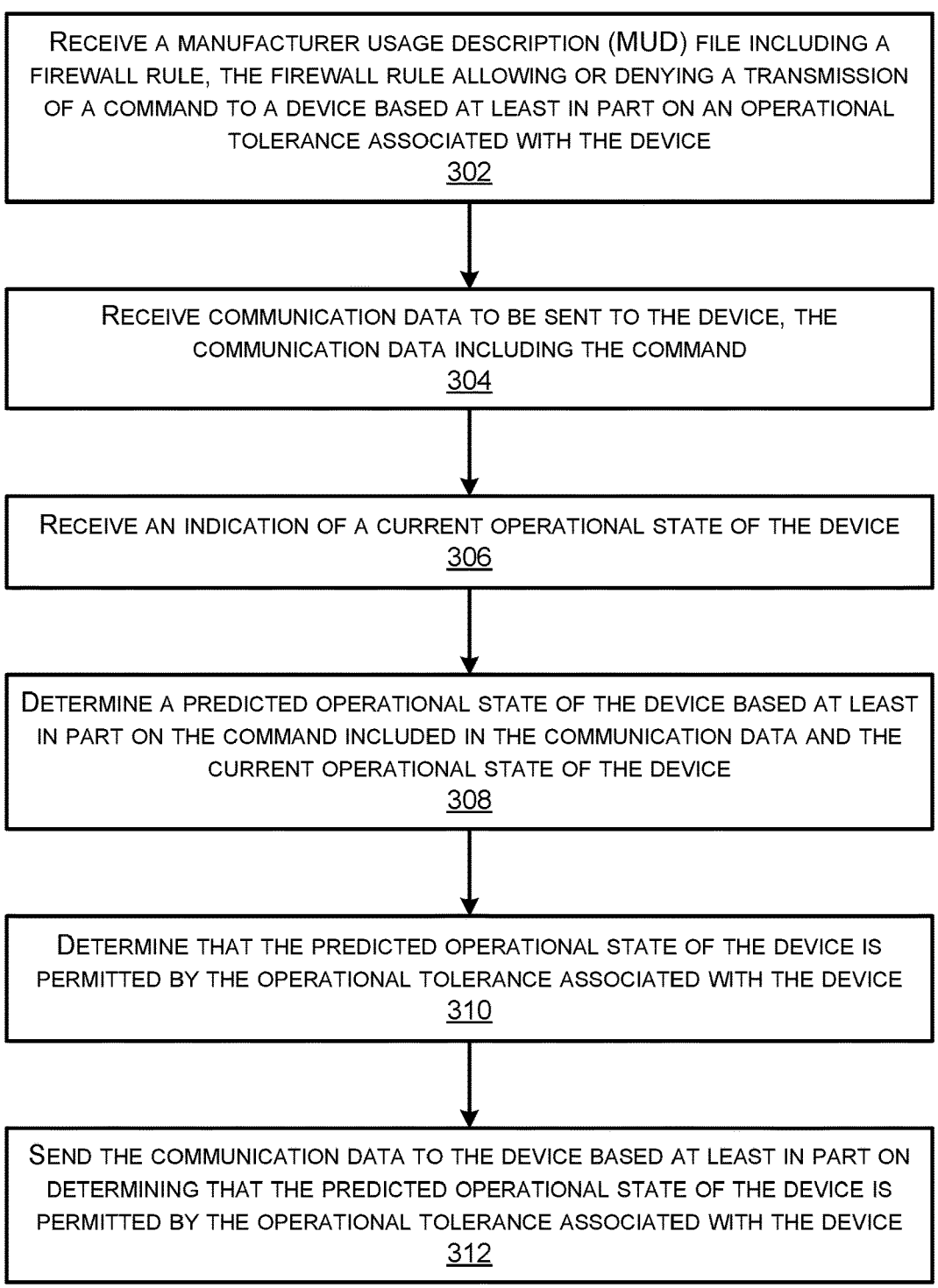
FIG. 3 illustrates a flow diagram of an example method for a firewall service to receive a MUD file including a firewall rule, determine a predicted operational state of a device based on a command included in communication data and a current operational state of the device, and sending the communication data to the device based on determining that the predicted operational state of the device is permitted by an operational tolerance of the device, indicated by the firewall rule.
Figure 4:
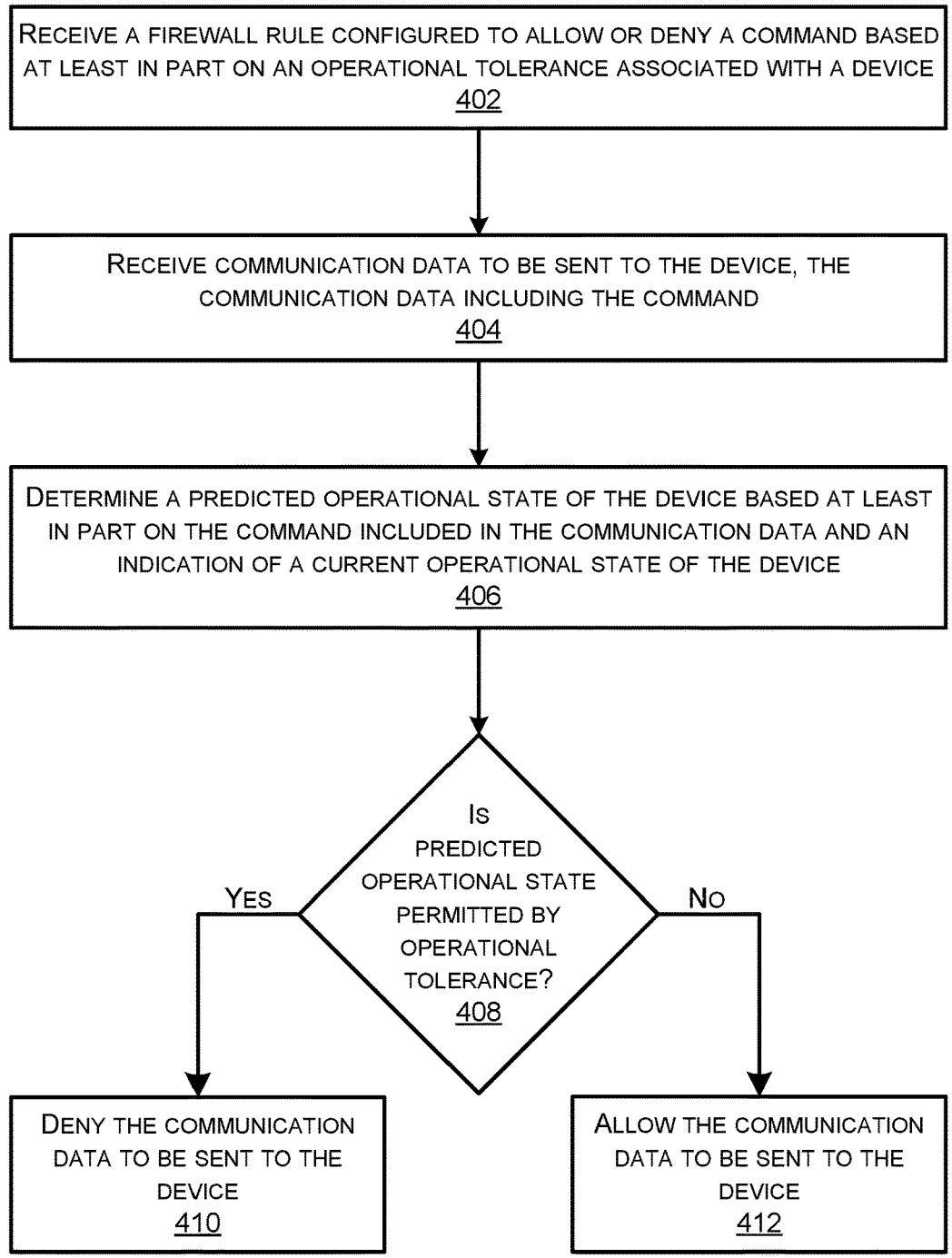
FIG. 4 illustrates a flow diagram of an example method for a firewall service to receive a firewall rule allowing or denying communication data to be sent to a device based on an operational tolerance associated with the device, analyzing command(s) within communication data to determine a predicted operational state of the device based on the command(s), and allowing or denying the communication data to be sent to the device based on whether the predicted operational state is permitted by the operational tolerance associated with the device.
Figure 5:
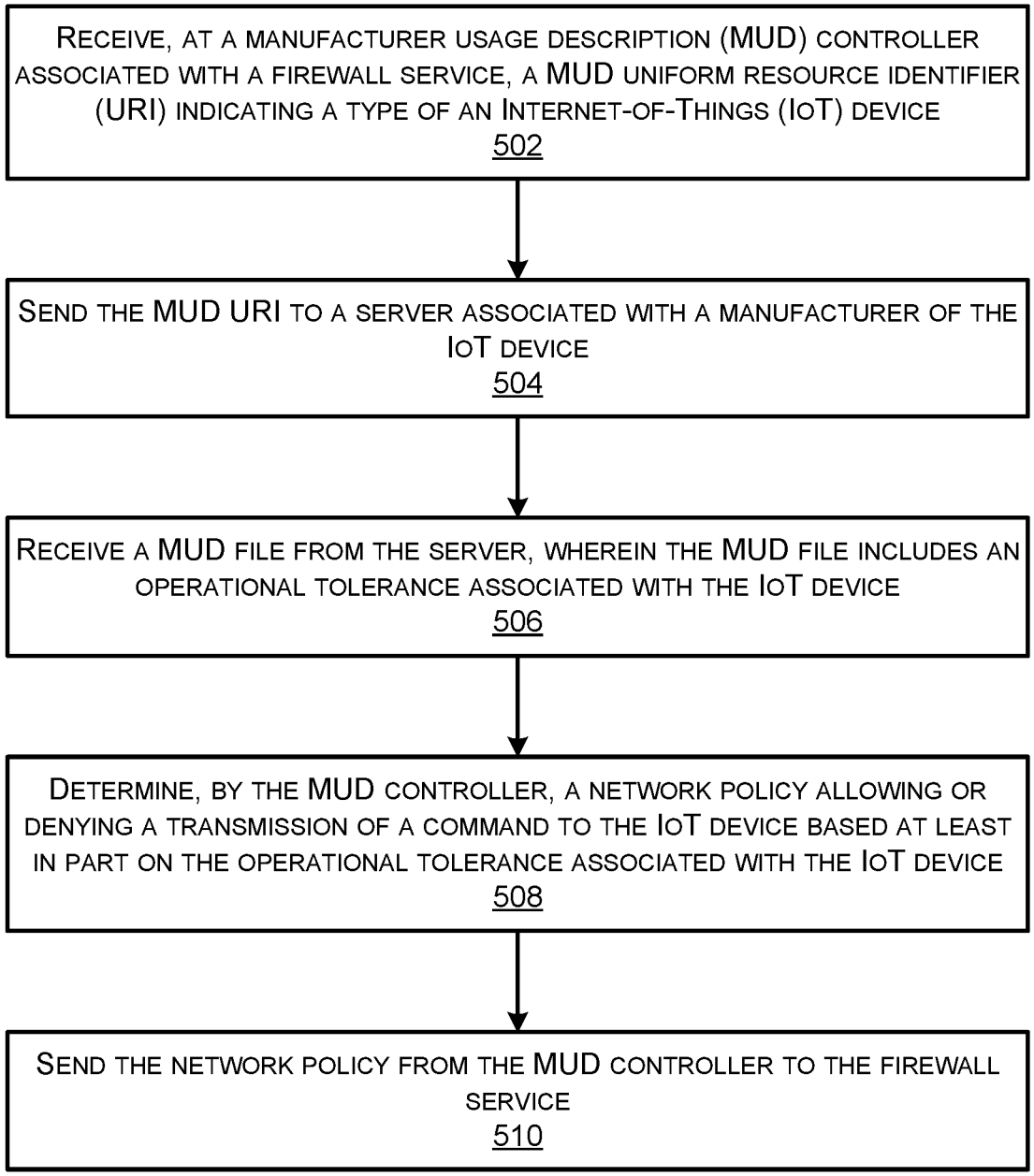
FIG. 5 illustrates a flow diagram of an example method for a MUD controller associated with a firewall service to receive a MUD file, including an operational tolerance associated with an IoT device, from a server associated with a manufacturer of the IoT device and determining a network policy, allowing or denying a transmission of a command to the IoT device based on the operational tolerance, to be provisioned at the firewall service.

FIGS. 3-5 illustrate flow diagrams of example methods 300, 400, and 600 and that illustrate aspects of the functions performed at least partly by the computing resource network 102, the MUD controller 104, and/or the firewall service 106 as described in FIGS. 1 and 2. The logical operations described herein with respect to FIGS. 3-5 may be implemented (1) as a sequence of computer-implemented acts or program modules running on a computing system and/or (2) as interconnected machine logic circuits or circuit modules within the computing system. In some examples, the method(s) 300, 400 and 600 may be performed by a system comprising one or more processors and one or more non-transitory computer-readable media storing computer-executable instructions that, when executed by the one or more processors, cause the one or more processors to perform the method(s) 300, 400, and 600.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3-5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a firewall service 106 to receive a MUD file 202 including a firewall rule, determine a predicted operational state of a device 108 based on a command included in communication data and a current operational state of the device 108, and sending the communication data to the device 108 based on determining that the predicted operational state of the device is permitted by an operational tolerance 204 of the device 108, indicated by the firewall rule. In some examples, the device, the firewall rule, the MUD file, and the operational tolerance may correspond to the IoT device 108, the network policy, the MUD file 202, and the operational tolerance 204, respectively, as described with respect to FIGS. 1 and 2.

At 302, the method 300 may include receiving a manufacturer usage description (MUD) file including a firewall rule. In some examples, the firewall rule may be configured to allow or deny a transmission of a command to a device based at least in part on an operational tolerance associated with the device. In some examples, the operational tolerance may include environmental information and/or compliance information associated with the device.

At 304, the method 300 may include receiving communication data to be sent to the device, the communication data including the command.

At 306, the method 300 may include receiving an indication of a current operational state of the device. In some examples, the indication of the current operational state may be based at least in part on telemetry data gathered by the network.

At 308, the method 300 may include determining a predicted operational state of the device. In some examples, the predicted operational state may be based at least in part on the command included in the communication data and/or the current operational state of the device.

At 310, the method 300 may include determining that the predicted operational state of the device is permitted by the operational tolerance associated with the device.

At 312, the method 300 may include sending the communication data to the device. In some examples, sending the communication data to the device may be based at least in part on determining that the predicted operational state of the device is permitted by the operational tolerance associated with the device.

In some examples, the operational tolerance may indicate at least one of a machine level tolerance associated with the device and/or an application level tolerance associated with an application executing on the device.

In some examples, the operational tolerance may be based at least in part on at least one of a type of the device, a location of the device, an environment associated with the device, an intended use associated with the device, and/or one or more additional devices associated with the device.

In some examples, the communication data may be first communication data. Additionally, or alternatively, the command may be a first command. Additionally, or alternatively, the method 300 may include receiving second communication data to be sent to the device. In some examples, the second communication data may include a second command. Additionally, or alternatively, the method 300 may include determining the predicted operational state of the device based at least in part on the first command, the second command, and/or the current operational state of the device. Additionally, or alternatively, the method 300 may include determining that the predicted operational state of the device is not permitted by the operational tolerance associated with the device. Additionally, or alternatively, the method 300 may include denying at least one of the first communication data or the second communication data to be sent to the device. Additionally, or alternatively, the method 300 may include allowing at least one of the first communication data or the second communication data to be sent to the device.

In some examples, the device may be a first device. Additionally, or alternatively, the communication data may be first communication data. Additionally, or alternatively, the command may be a first command. Additionally, or alternatively, the method 300 may include receiving second communication data including a second command to be sent to a second device associated with the first device. In some examples, operation of the second device may affect the current operational state of the first device. Additionally, or alternatively, the method 300 may include determining a predicted operation associated with the second device based at least in part on the second command. Additionally, or alternatively, the method 300 may include Additionally, or alternatively, the method 300 may include determining the predicted operational state of the first device based at least in part on the first command, the second command, and/or the current operational state of the first device. Additionally, or alternatively, the method 300 may include determining that the predicted operational state of the device is not permitted by the operational tolerance associated with the device. Additionally, or alternatively, the method 300 may include denying at least one of the first communication data to be sent to the first device or the second communication data to be sent to the second device. Additionally, or alternatively, the method 300 may include allowing at least one of the first communication data to be sent to the first device or the second communication data to be sent to the second device.

In some examples, the device may be associated with a supervisory control and data acquisition (SCADA) system. Additionally, or alternatively, the command may be a SCADA command received from a server associated with the SCADA system.

Additionally, or alternatively, the method 300 may include receiving the indication of the current operational state of the device from a MUD controller associated with the device.

FIG. 4 illustrates a flow diagram of an example method 400 for a firewall service 106 to receive a firewall rule allowing or denying communication data to be sent to a device 108 based on an operational tolerance associated with the device 108, analyzing command(s) within communication data to determine a predicted operational state of the device 108 based on the command(s), and allowing or denying the communication data to be sent to the device 108 based on whether the predicted operational state is permitted by the operational tolerance associated with the device 108. In some examples, the device, the firewall rule, and the operational tolerance may correspond to the IoT device 108, the network policy, and the operational tolerance 204, respectively, as described with respect to FIGS. 1 and 2.

At 402, the method 400 may include receiving a firewall rule configured to allow or deny a command based at least in part on an operational tolerance associated with a device.

At 404, the method 400 may include receiving communication data to be sent to the device, the communication data including the command.

At 406, the method 400 may include determining a predicted operational state of the device. In some examples, the predicted operational state may be based at least in part on the command included in the communication data and/or an indication of a current operational state of the device. For example, telemetry data may be collected by the network and leveraged to identify the current operational state of the device. Take, for example, telemetry data associated with the device that indicates that the current operational state of the IoT device is 90% to the operational tolerance (e.g., the autonomous vehicle is currently traveling at a speed of 90 miles per hour).

At 408, the method 400 may include determining whether the predicted operational state of the device is permitted by the operational tolerance associated with the device. In some examples, an operational tolerance of a device (or an associated operational device) may indicate an operational threshold (e.g., an operational tolerance specifying that a maximum speed of an autonomous vehicle should not exceed 100 miles per hour). The method may determine that execution of the control command (e.g., a control command representing an instruction to increase the speed by 11 miles per hour) by the device at the current operational state (e.g., 90 miles per hour) may result in the IoT device exceeding the operational tolerance (e.g., predicted state being 101 miles per hour and exceeding the 100 miles per hour operational tolerance). If the method 400 determines that the predicted operational state of the device is not permitted by the operational tolerance associated with the device, the method 400 may proceed to operation 410. Alternatively, if the method 400 determines that the predicted operational state of the device is permitted by the operational tolerance associated with the device, the method 400 may proceed to operation 412.

At 410, the method 400 may include denying the communication data to be sent to the device. In some examples, denying the communication data to be sent to the device may be based at least in part on determining that the predicted operational state of the device is not permitted by the operational tolerance associated with the device.

At 412, the method 400 may include allowing the communication data to be sent to the device. In some examples, allowing the communication data to be sent to the device may be based at least in part on determining that the predicted operational state of the device is permitted by the operational tolerance associated with the device.

In some examples, the communication data may be first communication data. Additionally, or alternatively, the command may be a first command. Additionally, or alternatively, the method 400 may include receiving second communication data to be sent to the device. In some examples, the second communication data may include a second command. Additionally, or alternatively, the method 400 may include determining the predicted operational state of the device based at least in part on the first command, the second command, and/or the current operational state of the device. Additionally, or alternatively, the method 400 may include determining that the predicted operational state of the device is not permitted by the operational tolerance associated with the device. Additionally, or alternatively, the method 400 may include denying at least one of the first communication data or the second communication data to be sent to the device.

In some examples, the device may be a first device. Additionally, or alternatively, the communication data may be first communication data. Additionally, or alternatively, the command may be a first command. Additionally, or alternatively, the method 400 may include receiving second communication data including a second command to be sent to a second device associated with the first device. In some examples, operation of the second device may affect the current operational state of the first device. Additionally, or alternatively, the method 400 may include determining a predicted operation associated with the second device based at least in part on the second command. Additionally, or alternatively, the method 400 may include determining the predicted operational state of the first device based at least in part on the first command, the second command, and the current operational state of the first device. Additionally, or alternatively, the method 400 may include determining that the predicted operational state of the device is not permitted by the operational tolerance associated with the device. Additionally, or alternatively, the method 400 may include denying at least one of the first communication data to be sent to the first device or the second communication data to be sent to the second device.

In some examples, the operational tolerance may indicate at least one of a machine level tolerance associated with the device and/or an application level tolerance associated with an application executing on the device.

In some examples, the operational tolerance may be based at least in part on at least one of a type of the device, a location of the device, an environment associated with the device, an intended use associated with the device, and/or one or more additional devices associated with the device.

In some examples, the device may be associated with a supervisory control and data acquisition (SCADA) system. Additionally, or alternatively, the command may be a SCADA command received from a server associated with the SCADA system.

FIG. 5 illustrates a flow diagram of an example method 500 for a MUD controller 104 associated with a firewall service 106 to receive a MUD file 202, including an operational tolerance associated with an IoT device 108, from a server 114 associated with a manufacturer of the IoT device 108 and determining a network policy, allowing or denying a transmission of a command to the IoT device 108 based on the operational tolerance, to be provisioned at the firewall service 106. In some examples, the MUD controller, the IoT device, the firewall service, the MUD file, the network policy, and the operational tolerance may correspond to the MUD controller 104, the IoT device 108, the firewall service 106, the MUD file 202, the network policy, and the operational tolerance 204, respectively, as described with respect to FIGS. 1 and 2.

At 502, the method 500 may include receiving, at a manufacturer usage description (MUD) controller associated with a firewall service, a MUD uniform resource identifier (URI) indicating a type of an Internet-of-Things (IoT) device.

At 504, the method 500 may include sending the MUD URI to a server associated with a manufacturer of the IoT device. The server may comprise a machine building component configured to modify a traditional MUD file (indicating which protocols and/or ports should be allowed for a particular IoT device) associated with the IoT device to include one or more operational tolerances associated with the IoT device.

Additionally, or alternatively, the machine building component may be configured to further modify the traditional MUD file and/or the modified MUD file (e.g., the MUD file indicating operational tolerances) associated with the IoT device to include environmental information associated with the IoT device. In some examples, environmental information may indicate operating temperature thresholds associated with the IoT device, humidity and/or moisture level thresholds associated with the IoT device, required dust protection associated with the IoT device, and the like. Additionally, or alternatively, the machine building component may be configured to further modify the traditional MUD file and/or a modified MUD file associated with the IoT device to include compliance information associated with the IoT device. In some examples, compliance information may indicate various data and/or certifications associated with the IoT device, such as, for example, environmental data and/or certifications, immunity data and/or certifications, safety data and/or certifications, and/or emissions data and/or certifications.

At 506, the method 500 may include receiving a MUD file from the server, wherein the MUD file includes an operational tolerance associated with the IoT device. In some examples, the MUD controller may be configured to parse the MUD file to identify the operational tolerance and/or one or more additional operational tolerance(s) associated with the IoT device.

At 508, the method 500 may include determining, by the MUD controller, a network policy allowing or denying a transmission of a command to the IoT device. In some examples, the MUD controller may determine the network policy based at least in part on the operational tolerance associated with the IoT device.

At 510, the method 500 may include sending the network policy from the MUD controller to the firewall service. Additionally, or alternatively, the MUD controller may be configured to provision the network policy at the firewall service, such that communication data may be analyzed by the firewall service and allowed or denied transmission to the IoT device according to the network policy.

Additionally, or alternatively, the operational tolerance may indicate at least one of a machine level tolerance associated with the IoT device and/or an application level tolerance associated with an application executing on the IoT device Additionally, or alternatively, the operational tolerance may be based at least in part on at least one of a type of the IoT device, a location of the IoT device, an environment associated with the IoT device, an intended use associated with the IoT device, and/or one or more additional IoT devices associated with the IoT device.

Additionally, or alternatively, the IoT device may be associated with a supervisory control and data acquisition (SCADA) system. Additionally, or alternatively, the command may be a SCADA command received from a server associated with the SCADA system.

Additionally, or alternatively, the method 500 may include receiving, at the MUD controller, telemetry data associated with the IoT device. In some examples, the telemetry data may indicate a current operational state of the IoT device. Additionally, or alternatively, the method 500 may include determining that the current operational state of the IoT device is not permitted the operational tolerance associated with the IoT device. Additionally, or alternatively, the method 500 may include generating an instruction to change a behavior of the IoT device to a predicted operational state. In some examples, the predicted operational state may be configured to not exceed the operational tolerance associated with the IoT device. Additionally, or alternatively, the method 500 may include sending an alert to the IoT device including the instruction.

Additionally, or alternatively, the operational tolerance may be a first operational tolerance. Additionally, or alternatively, the method 500 may include determining, by the MUD controller and based at least in part on the first operational tolerance and a user input from an admin associated with the MUD controller, a second operational tolerance associated with the IoT device. In some examples, the second operational tolerance may be different from the first operational tolerance. Additionally, or alternatively, the method 500 may include determining the network policy based at least in part on the second operational tolerance associated with the IoT device.

Additionally, or alternatively, the IoT device may be a first IoT device. Additionally, or alternatively, the method 500 may include determining, by the MUD controller, that a second IoT device is associated with the first IoT device. In some examples, operation of the second IoT device may affect a first current operational state of the first IoT device. Additionally, or alternatively, the method 500 may include receiving, at the MUD controller, telemetry data associated with the first IoT device and the second IoT device. In some examples, the telemetry data may indicate the first current operational state of the first IoT device and/or a second current operational state of the second IoT device. Additionally, or alternatively, the method 500 may include determining the network policy based at least in part on at least one of the first current operational state of the first IoT device and/or the second current operational state of the second IoT device.

Figure 6:
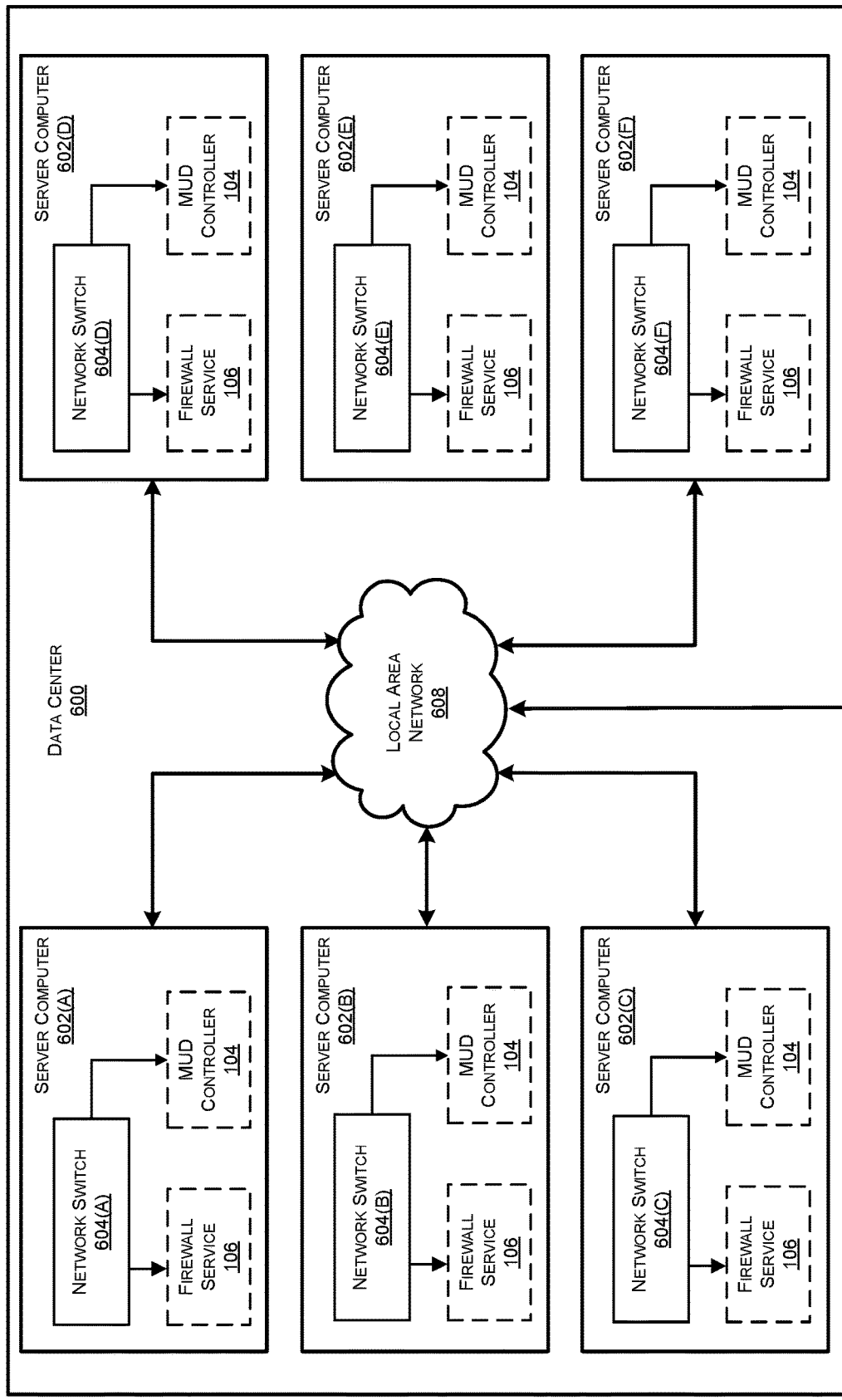
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers described herein with respect to FIG. 1.

The server computers 602 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more network device(s) 112, the firewall service 108, and/or the MUD controller 106, provisioned across a set or cluster of servers 602.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
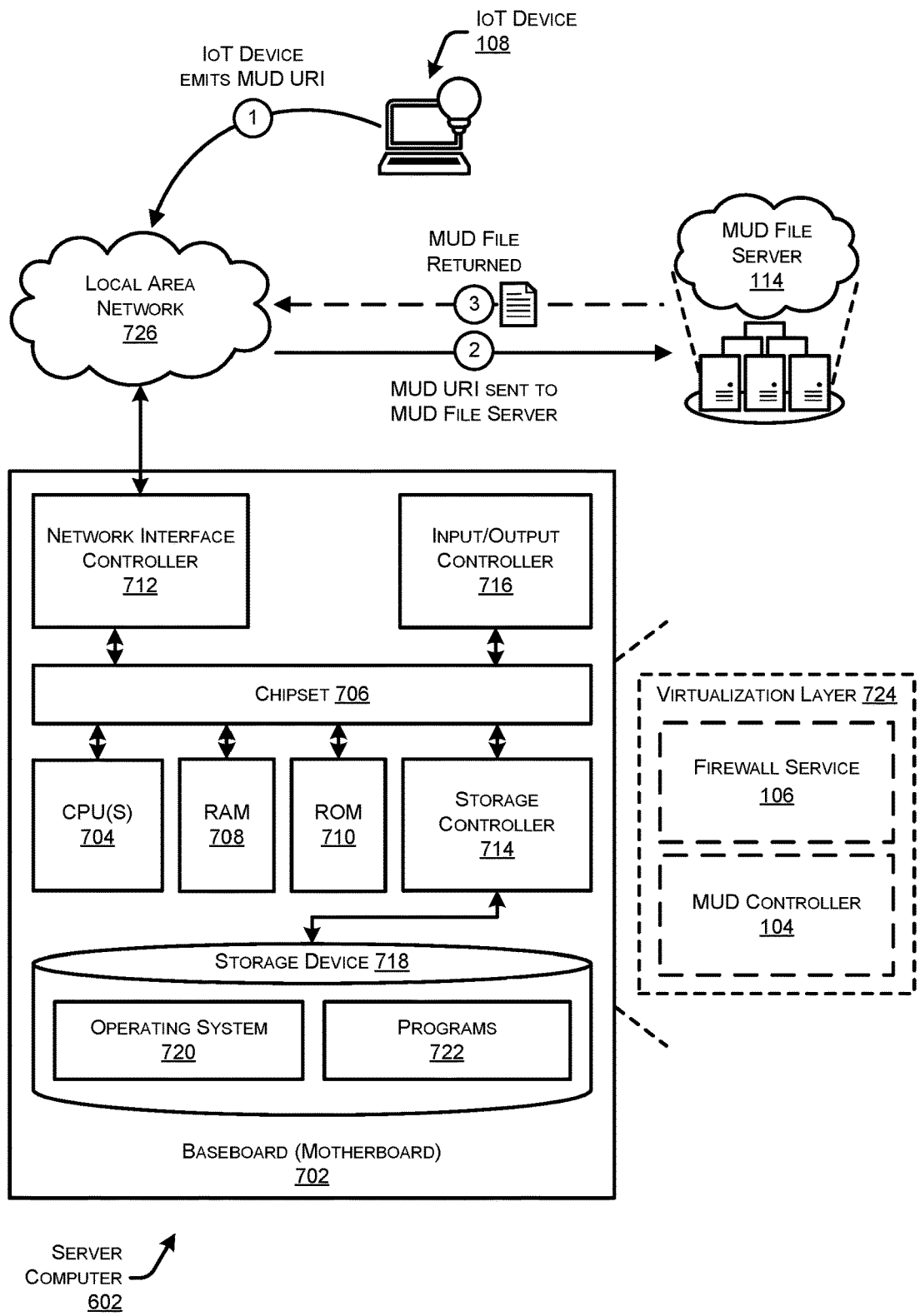
FIG. 7 is a computer architecture diagram showing an illustrative computer hardware architecture for implementing a server device that can be utilized to implement aspects of the various technologies presented herein.

FIG. 7 shows an example computer architecture for a computing device (or network switch) 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 602 may, in some examples, correspond to a physical server described herein with respect to FIG. 1.

The computing device 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 602. The chipset 706 can further provide an interface to a computer-readable storage medium such as a read-only memory ("ROM") 710 or non-volatile RAM ("NVRAM") for storing basic routines that help to startup the computing device 602 and to transfer information between the various components and devices. The ROM 710 or NVRAM can also store other software components necessary for the operation of the computing device 602 in accordance with the configurations described herein.

The computing device 602 can operate in a networked environment using logical connections to remote computing devices and computer systems through a network, such as the network 726. The chipset 706 can include functionality for providing network connectivity through a NIC 712, such as a gigabit Ethernet adapter. The NIC 712 is capable of connecting the computing device 602 to other computing devices over the network 726 (or 212). It should be appreciated that multiple NICs 712 can be present in the computing device 602, connecting the computer to other types of networks and remote computer systems.

The computing device 602 can be connected to a storage device 718 that provides non-volatile storage for the computing device 602. The storage device 718 can store an operating system 720, programs 722, and data, which have been described in greater detail herein. The storage device 718 can be connected to the computing device 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 602 can further read information from the storage device 718 by detecting the physical states or characteristics of one or more particular locations within the physical storage units.

In addition to the mass storage device 718 described above, the computing device 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 602. In some examples, the operations performed by the computing resource network 102, and or any components included therein, may be supported by one or more devices similar to computing device 602. Stated otherwise, some or all of the operations performed by the computing resource network 102, and or any components included therein, may be performed by one or more computing device 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 602. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 718 can store other system or application programs and data utilized by the computing device 602.

In one embodiment, the storage device 718 or other computer-readable storage media is encoded with computer-executable instructions which, when loaded into the computing device 602, transform the computer from a general-purpose computing system into a special-purpose computer capable of implementing the embodiments described herein. These computer-executable instructions transform the computing device 602 by specifying how the CPUs 704 transition between states, as described above. According to one embodiment, the computing device 602 has access to computer-readable storage media storing computer-executable instructions which, when executed by the computing device 602, perform the various processes described above with regard to FIGS. 1-5. The computing device 602 can also include computer-readable storage media having instructions stored thereupon for performing any of the other computer-implemented operations described herein.

The computing device 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 602 might not include all of the components shown in FIG. 6, can include other components that are not explicitly shown in FIG. 6, or might utilize an architecture completely different than that shown in FIG. 6.

The server computer 602 may support a virtualization layer 724, such as one or more services associated with the computing resource network 102, such as, for example, the firewall; service 106 and/or the MUD controller 104 executing on the server computer 602. In some examples, the virtualization layer 724 may be supported by a hypervisor that provides one or more virtual machines running on the server computer 602 to perform functions described herein. The virtualization layer 724 may generally support a virtual resource that performs at least portions of the techniques described herein. An IoT device 108 may emit a MUD URI, that the MUD controller 104 may utilize to fetch a MUD file 202 from a MUD file server 114. The MUD file may be parsed by the MUD controller 104 to identify one or more operational tolerance(s) associated with the IoT device 108 that may be used to determine a network policy that may be provisioned at the firewall service 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving a manufacturer usage description (MUD) file including a firewall rule, the firewall rule allowing or denying a transmission of a command to a device based at least in part on an operational tolerance associated with the device;
   receiving communication data to be sent to the device, the communication data including the command;
   receiving an indication of a current operational state of the device;
   determining a predicted operational state of the device based at least in part on the command included in the communication data and the current operational state of the device;
   determining that the predicted operational state of the device is permitted by the operational tolerance associated with the device; and
   sending the communication data to the device based at least in part on determining that the predicted operational state of the device is permitted by the operational tolerance associated with the device.

2. The method of claim 1, wherein the operational tolerance indicates at least one of a machine level tolerance associated with the device or an application level tolerance associated with an application executing on the device.

3. The method of claim 1, wherein the operational tolerance is based at least in part on at least one of:
   a type of the device;
   a location of the device;
   an environment associated with the device;
   an intended use associated with the device; and
   one or more additional devices associated with the device.

4. The method of claim 1, wherein the communication data is first communication data and the command is a first command, and the method further comprising:
- receiving second communication data to be sent to the device, the second communication data including a second command;
- determining the predicted operational state of the device based at least in part on the first command, the second command, and the current operational state of the device;
- determining that the predicted operational state of the device is not permitted by the operational tolerance associated with the device; and
- denying at least one of the first communication data or the second communication data to be sent to the device.

5. The method of claim 1, wherein the device is a first device, the communication data is first communication data, and the command is a first command, and the method further comprising:
- receiving second communication data including a second command to be sent to a second device associated with the first device, wherein operation of the second device affects the current operational state of the first device;
- determining a predicted operation associated with the second device based at least in part on the second command;
- determining the predicted operational state of the first device based at least in part on the first command, the second command, and the current operational state of the first device;
- determining that the predicted operational state of the device is not permitted by the operational tolerance associated with the device; and
- denying at least one of the first communication data to be sent to the first device or the second communication data to be sent to the second device.

6. The method of claim 1, wherein the device is associated with a supervisory control and data acquisition (SCADA) system and the command is a SCADA command received from a server associated with the SCADA system.

7. The method of claim 1, further comprising receiving the indication of the current operational state of the device from a MUD controller associated with the device.

8. A system comprising:
- one or more processors; and
- one or more computer-readable media storing computer-executable instructions that, when executed by the one or more processors, cause the one or more processors to perform operations comprising:
  - receiving, at a first device, a firewall rule configured to allow or deny a command based at least in part on an operational tolerance associated with a second device;
  - receiving communication data to be sent to the second device, the communication data including the command;
  - determining a predicted operational state of the second device based at least in part on the command included in the communication data and an indication of a current operational state of the second device; and
  - allowing the communication data to be sent to the second device based at least in part on determining that the predicted operational state of the second device is permitted by the operational tolerance associated with the second device.

9. The system of claim 8, wherein the communication data is first communication data and the command is a first command, and the operations further comprising:
- receiving second communication data to be sent to the second device, the second communication data including a second command;
- determining the predicted operational state of the second device based at least in part on the first command, the second command, and the current operational state of the second device;
- determining that the predicted operational state of the second device is not permitted by the operational tolerance associated with the second device; and
- denying at least one of the first communication data or the second communication data to be sent to the second device.

10. The system of claim 8, wherein the communication data is first communication data, and the command is a first command, and the operations further comprising:
- receiving second communication data including a second command to be sent to a third device associated with the second device, wherein operation of the third device affects the current operational state of the second device;
- determining a predicted operation associated with the second third device based at least in part on the second command;
- determining the predicted operational state of the first second device based at least in part on the first command, the second command, and the current operational state of the second device;
- determining that the predicted operational state of the second device is not permitted by the operational tolerance associated with the second device; and
- denying at least one of the first communication data to be sent to the second device or the second communication data to be sent to the third device.

11. The system of claim 8, wherein the operational tolerance indicates at least one of a machine level tolerance associated with the second device or an application level tolerance associated with an application executing on the second device.

12. The system of claim 8, wherein the operational tolerance is based at least in part on at least one of:
- a type of the second device;
- a location of the second device;
- an environment associated with the second device;
- an intended use associated with the second device; and
- one or more third devices associated with the second device.

13. The system of claim 8, wherein the second device is associated with a supervisory control and data acquisition (SCADA) system and the command is a SCADA command received from a server associated with the SCADA system.

14. A method comprising:
- receiving, at a manufacturer usage description (MUD) controller associated with a firewall service, a MUD uniform resource identifier (URI) indicating a type of an Internet-of-Things (IoT) device;
- sending the MUD URI to a server associated with a manufacturer of the IoT device;
- receiving a MUD file from the server, wherein the MUD file includes an operational tolerance associated with the IoT device;
- determining, by the MUD controller, a network policy allowing or denying a transmission of a command to the IoT device based at least in part on the operational tolerance associated with the IoT device; and sending the network policy from the MUD controller to the firewall service.

15. The method of claim 14, wherein the operational tolerance indicates at least one of a machine level tolerance associated with the IoT device or an application level tolerance associated with an application executing on the IoT device.

16. The method of claim 14, wherein the operational tolerance is based at least in part on at least one of:
   a type of the IoT device;
   a location of the IoT device;
   an environment associated with the IoT device;
   an intended use associated with the IoT device; and
   one or more additional IoT devices associated with the IoT device.

17. The method of claim 14, wherein the IoT device is associated with a supervisory control and data acquisition (SCADA) system and the command is a SCADA command received from a server associated with the SCADA system.

18. The method of claim 14, further comprising:
   receiving, at the MUD controller, telemetry data associated with the IoT device, the telemetry data indicating a current operational state of the IoT device;
   determining that the current operational state of the IoT device is not permitted by the operational tolerance associated with the IoT device;
   generating an instruction to change a behavior of the IoT device to a predicted operational state, wherein the predicted operational state is permitted by the operational tolerance associated with the IoT device; and
   sending an alert to the IoT device including the instruction.

19. The method of claim 14, wherein the operational tolerance is a first operational tolerance, and the method further comprising:
   determining, by the MUD controller and based at least in part on the first operational tolerance and a user input from an admin associated with the MUD controller, a second operational tolerance associated with the IoT device, the second operational tolerance being different from the first operational tolerance; and
   wherein determining the network policy is based at least in part on the second operational tolerance associated with the IoT device.

20. The method of claim 14, wherein the IoT device is a first IoT device, and the method further comprising:
   determining, by the MUD controller, that a second IoT device is associated with the first IoT device, wherein operation of the second IoT device affects a first current operational state of the first IoT device;
   receiving, at the MUD controller, telemetry data associated with the first IoT device and the second IoT device, the telemetry data indicating the first current operational state of the first IoT device and a second current operational state of the second IoT device; and
   wherein determining the network policy is based at least in part on at least one of the first current operational state of the first IoT device and the second current operational state of the second IoT device.

* * * * *